US006021126A

United States Patent [19]
White et al.

[11] Patent Number: 6,021,126
[45] Date of Patent: Feb. 1, 2000

[54] TELECOMMUNICATION NUMBER PORTABILITY

[75] Inventors: Patrick E. White, Vienna; Robert D. Farris, Sterling, both of Va.

[73] Assignee: Bell Atlantic Network Services, Inc., Arlington, Va.

[21] Appl. No.: 08/729,215

[22] Filed: Oct. 9, 1996

Related U.S. Application Data

[63] Continuation-in-part of application No. 08/670,908, Jun. 26, 1996.

[51] Int. Cl.⁷ .............................. H04L 12/28; H04J 1/00; H04M 11/00
[52] U.S. Cl. ..................... 370/352; 370/389; 370/401; 370/427; 370/485; 379/90.01; 379/93.01; 379/100.15
[58] Field of Search .................................. 370/352, 353, 370/380, 389, 392, 396, 401, 404, 427, 435, 450, 465, 485; 379/90.01, 93.01, 93.05, 93.09, 100.15, 100.16

[56] References Cited

U.S. PATENT DOCUMENTS

| | | | |
|---|---|---|---|
| 4,191,860 | 3/1980 | Weber | 379/115 |
| 4,313,035 | 1/1982 | Jordon et al. | 379/207 |
| 4,555,594 | 11/1985 | Friedes et al. | 379/220 |
| 4,565,903 | 1/1986 | Riley | 379/220 |
| 4,577,066 | 3/1986 | Bimonte et al. | 379/221 |
| 4,872,160 | 10/1989 | Hemmady et al. | 370/353 |
| 4,958,341 | 9/1990 | Hemmady et al. | 370/352 |
| 5,008,926 | 4/1991 | Misholi | 379/89 |
| 5,012,511 | 4/1991 | Hanle et al. | 379/211 |
| 5,029,199 | 7/1991 | Jones et al. | 379/89 |
| 5,193,110 | 3/1993 | Jones et al. | 379/93.14 |
| 5,206,901 | 4/1993 | Harlow et al. | 379/211 |
| 5,243,645 | 9/1993 | Bissell et al. | 379/211 |
| 5,247,571 | 9/1993 | Kay et al. | 379/207 |
| 5,341,374 | 8/1994 | Lewen et al. | 370/450 |

(List continued on next page.)

OTHER PUBLICATIONS

Mills, M. (Mar. 8, 1996) "Freebie Heebie–Jeebies: New Long–Distance Calling Via the Internet Scares Small Phone Firms", *The Washington Post*, sec. F, pp. 1–2.
Hughes, D.T. (Feb. 21, 1996) "What Hath (Net) God Wrought?", *The Journal* [Fairfax, Virginia], sec. B, pp. 1–2.
Hughes, D.T. (May 28, 1996) "WebPhone Heading for Serious Telephony", *The Journal*, [Fairfax, Virginia], sec. A, p. 8.
Mills, M. (Jan. 23, 1996) "It's the Net's Best Thing to Being There: With Right Software, Computer Becomes Toll–Free Telephone", *The Washington Post*, sec. C, pp. 1,5.
Hughes, D.T. (Jan. 2, 1996) "Internet Phone Wars Heating Up: Companies Improve and Encourage Users to Test Products", *The Journal*, [Fairfax, Virginia], sec. A, p. 6.

(List continued on next page.)

*Primary Examiner*—Fan S. Tsang
*Assistant Examiner*—Allan Hoosain
*Attorney, Agent, or Firm*—McDermott, Will & Emery

[57] ABSTRACT

A telecommunications system wherein the dialing of a directory number which has been ported triggers an intelligent network signal which is directed to the Internet. The signal is transmitted through the Internet to a database in the Internet. The database returns call set up directions which are used by the originating switching system to establish a voice link from the calling station to the station having the ported number. The intelligent network signal may be transmitted from the originating switching system to a signal transfer point (STP) and to the Internet. Within the Internet the signal is directed to an Internet database where a real number for the ported number is obtained. This is transmitted back to the signal switching point, which then uses the real number to complete the connection. In another embodiment, where a number has been ported to a station that is connected only to the Internet, the Internet database may provide a domain name address. This address is then used to establish a link through the Internet between the calling and called station. In this instance the Internet handles both the signaling and the voice connections.

46 Claims, 7 Drawing Sheets

U.S. PATENT DOCUMENTS

| | | | |
|---|---|---|---|
| 5,375,068 | 12/1994 | Palmer et al. | 395/200.34 |
| 5,377,186 | 12/1994 | Wegner et al. | 370/62 |
| 5,384,831 | 1/1995 | Creswell et al. | 379/67 |
| 5,384,840 | 1/1995 | Blatchford et al. | 379/229 |
| 5,410,754 | 4/1995 | Koltzbach et al. | 370/466 |
| 5,425,090 | 6/1995 | Orriss | 379/201 |
| 5,425,091 | 6/1995 | Josephs | 379/201 |
| 5,434,913 | 7/1995 | Tung et al. | 379/202 |
| 5,469,500 | 11/1995 | Satter et al. | 379/201 |
| 5,481,603 | 1/1996 | Gutierrez et al. | 379/221 |
| 5,490,247 | 2/1996 | Tung et al. | 345/501 |
| 5,493,568 | 2/1996 | Sampat et al. | 370/261 |
| 5,506,887 | 4/1996 | Emery et al. | 379/58 |
| 5,572,583 | 11/1996 | Wheeler, Jr. et al. | 379/207 |
| 5,583,920 | 12/1996 | Wheeler, Jr. | 379/88 |
| 5,583,926 | 12/1996 | Venier et al. | 379/207 |
| 5,583,929 | 12/1996 | Ardon | 379/230 |
| 5,590,133 | 12/1996 | Billström et al. | 370/349 |
| 5,598,464 | 1/1997 | Hess et al. | 379/213 |
| 5,604,737 | 2/1997 | Iwami et al. | 370/60 |
| 5,608,786 | 3/1997 | Gordon | 379/100 |
| 5,610,910 | 3/1997 | Focsaneanu et al. | 370/351 |
| 5,610,977 | 3/1997 | Williams et al. | 379/207 |
| 5,625,681 | 4/1997 | Butler, II | 379/207 |
| 5,661,790 | 8/1997 | Hsu | 379/209 |
| 5,706,286 | 1/1998 | Reiman et al. | 370/401 |
| 5,712,903 | 1/1998 | Bartholomew et al. | 379/89 |
| 5,724,355 | 3/1998 | Bruno et al. | 370/401 |
| 5,726,984 | 3/1998 | Kubler et al. | 370/349 |
| 5,742,670 | 4/1998 | Bennett | 379/142 |
| 5,742,905 | 4/1998 | Pepe et al. | 455/461 |
| 5,751,707 | 5/1998 | Voit et al. | 370/384 |
| 5,790,548 | 8/1998 | Sistanizadeh et al. | 370/401 |
| 5,793,762 | 8/1998 | Penners et al. | 370/389 |

OTHER PUBLICATIONS

Yang, C. (Feb. 12, 1997), INETPhone: Telephone Services and Serves on Internet. http://ds.internic.net/rfc/rfc/rfc1789.txt.

Kuehn, Richard A. (Jul. 1994) "The Voice of Technology", [Online text only] *Credit World,* vol. 82, No. 6, pp. 20–23.

Margulies, Edwin (Aug. 1996) Understanding the Voice–Enabled Internet, Flatiron Publishing, Inc., pp. 4–42 and 12–1 to 12–3.

TELECOMMUNICATION NUMBER PORTABILITY

RELATED APPLICATIONS

This application is a continuation-in-part of application Ser. No. 08/670,908, filed Jun. 26, 1996, titled Internet Telephone Service, which application is incorporated by reference herein in its entirety.

TECHNICAL FIELD

This invention pertains to telecommunications networks in general and particularly to the provision of number portability in public switched telephone networks. More specifically, the invention pertains to a new telephone service whereby a subscriber may change local exchange carriers and still retain the same directory number.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Advanced Intelligent Network (AIN)
Automated Teller Machine (ATM)
Automated Number Identification (ANI)
Called Party Number (CPN)
Carrier Portability Code (CPC)
Central Office (CO)
Common Channel Signaling (CCS)
Common Channel Interoffice Signaling (CCIS)
Customer Number Address (CNA)
Destination Point Code (DPC)
Domain Name Service (DNS)
Dual Tone Multifrequency (DTMF)
Dynamic Host Configuration Protocol (DHCP)
Generic Address Parameter (GAP)
Global Title Translation (GTT)
Global Title (GTT)
Initial Address Message (IAM)
Integrated Services Digital Network (ISDN)
Integrated Service Control Point (ISCP)
Intelligent Network (IN)
Interchangeable Numbering Plan Area (INPA)
International Standards Organization (ISO)
Internet Gateway Router (IGR)
Internet Service Provider (ISP)
Local Area Number Portability (LANP)
Local Access and Transport Area (LATA)
Location Routing Number (LRN)
Message Signaling Unit (MSU)
Network Node Address (NNA)
Network Control Point (NCP)
Non-Geographic Number (NGN)
North American Numbering Plan (NANP)
Open Systems Interconnection (OSI)
Origination Point Code (OPC)
Person Locator Telephone Number (PLN)
Point in Call (PIC)
Point in Routing (PIR)
Point of Presence (POP)
Query on Release (QOR)
Release-to-Pivot (RTP)
Service Creation Environment (SCE)
Service Control Point (SCP)
Service Switching Point (SSP)
Signal Switching Point (SSP)
Signal Transfer Point (STP)
Signal Control Point (SCP)
Signaling Point (SP)
Signaling System 7 (SS7)
Signaling Switching Point (SSP)
Signaling Transfer Point (STP)
Signaling System 7 (SS7)
Software Defined Network (SDN)
Traffic Service Position System (TSPS)
Transaction Capabilities Applications Protocol (TCAP)
Universal Global Translation (UGT)

BACKGROUND OF THE INVENTION

Because most telephone numbers within the North American Numbering Plan (NANP) are associated with a particular switch operated by a particular service provider, they currently cannot be transferred outside the service area of such a switch or between switches operated by different service providers without technical changes to the switch or network. Several methods have been proposed to provide telephone number portability. These methods generally consist of two types: database and non-database methods.

A number of methods have been proposed for implementing service provider portability that use databases containing the customer routing information necessary to route telephone calls to the proper terminating locations. All these methods depend on Advanced Intelligent Network (AIN) capabilities.

AT&T has proposed a Location Routing Number (LRN) method. Essentially LRN assigns a unique 10-digit telephone number to each switch in a defined geographic area. The location routing number serves as a network address. Carriers routing telephone calls to customers that have transferred their telephone numbers from one carrier to another perform a database query to obtain the location routing number (LRN) that corresponds to the dialed telephone number. The database query is performed for all calls to switches from which at least one number has been ported. The carrier then would route the call to the new carrier based on the location routing number (LRN).

Several other carriers have developed a method referred to as the Carrier Portability Code (CPC) method. This method operates in a similar manner to LRN. Under CPC, however, the database associates the dialed telephone number with a 3-digit carrier portability code identifying the particular carrier to whom the dialed number has been transferred, rather than a particular switch.

Still other carriers have developed another database method commonly referred to as Local Area Number Portability (LANP). This method uses two "domains" of 10-digit numbers to route telephone calls to customers that have transferred their numbers to new carriers or new geographic locations. Specifically, LANP assigns a 10-digit customer number address (CNA) to each end user; this is the number that callers would dial to place telephone calls to the particular end user. It also assigns each customer a 10-digit network node address (NNA) that identifies where in the telephone network to reach the particular end user. Both the CNA and the NNA are stored in routing databases so that carriers con determine from the dialed telephone number where in the network to reach the called party.

Still another carrier has proposed a so called Non-Geographic Number (NGN) method. While this method uses a database, it operates in a fundamentally different manner from CPC, LRN, and LANP. The NGN method would provide service provider and location portability to end users by assigning them non-geographic telephone numbers, such as an INPA (interchangeable numbering plan area) code that has been assigned for non-geographic numbers. Telephone calls to such end users would be routed in much the same way as toll free calls are today, by performing a database query to determine the geographic telephone number corresponding to the dialed non-geographic telephone number, and routing the call to the appropriate geographic number.

Yet another carrier has proposed a triggering mechanism which operates in conjunction with the same addressing scheme utilized in the AT&T LRN method. This mechanism, called Query on Release (QOR) or Look Ahead, determines under what circumstances a database query is performed. Under QOR, the signaling used to set up a telephone call is routed to the end office switch to which the dialed telephone number was originally assigned (the release switch), i.e., according to the NPA-NXX of the dialed number. If the dialed number has been transferred to another carrier's switch, the previous switch in the call path queries the database to obtain the routing information. The call is then completed to the new carrier's switch.

Another number portability method triggering mechanism that is similar to QOR is Release-to-Pivot (RTP). RTP differs from QOR in that when a number has been ported from the release switch, the release switch, rather than the previous switch in the call path, returns the address information necessary for routing the call. The information regarding where to route the telephone call, if the number has been transferred, may be contained either in the release switch or an external database.

A number of U.S. patents describe related procedures.

Weber U.S. Pat. No. 4,191,860 discloses an intelligent telephone network for providing special call processing services via a number of local switching offices based on information stored in a central database. The example given of a special service is an INward WATS service.

Jordan et al., U.S. Pat. No. 4,313,035 discloses a method of using an intelligent network to provide a person locator service through multiple exchanges of the switched telephone network using an AIN type of telephone system architecture. As part of this service, the system provides subscriber access to the subscriber's data in the central data base of the intelligent network, to input data for controlling the person locator service.

Each subscriber to the locator service has a unique person locator telephone number (PLN). To access the system to update data in the data base, the subscriber dials 0700 and his unique person locator telephone number. The telephone switching office routes the call to a traffic service position system (TSPS), which prompts the caller (e.g., provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record.

An absent subscriber can input a number to which calls are to be completed, such as the number where the subscriber can be reached, into the central data base. A caller wishing to reach the subscriber dials the subscriber's unique person locator number. A telephone switching office having access to CCIS sends the dialed number to the central data base. The data base retrieves the stored completion number for the called subscriber and forwards that number back to the switching office to complete the call.

Friedes et al., U.S. Pat. No. 4,555,594, and Riley, U.S. Pat. No. 4,565,903, have disclosures which are similar and directed to communication call routing in a multi-carrier environment, in particular to the selection of an interexchange call carrier and the routing and connection of a call to the selected carrier. A carrier for an originating terminal link's telephone call is selected by examining signals associated with the call and received over the terminal link to determine whether they include signals other than call destination-identifying signals that identify a carrier, and if a carrier cannot be so identified, by examining contents of a memory associated with the terminal link to determine whether they identify a carrier. A second memory can be examined to determine whether they identify a carrier when even the memory associated with the terminal link does not identify a carrier. When a carrier cannot be identified, a request is made over the terminal link that a carrier be identified. Once a carrier is identified, connection of the call to that carrier is attempted.

A subscriber is allowed to presubscribe any carrier by having information identifying that carrier entered in a memory associated with the subscriber's terminal link. The subscriber can then have interexchange calls routed to that carrier without taking any additional steps to select or specify the carrier. The subscriber can select any available carrier on a per-call basis by transmitting, e.g., dialing, signals identifying the desired carrier. Thus, a subscriber may prefer one carrier for certain calls and another for other calls. A caller can complete interexchange calls without having to select a carrier by identifying in a second memory a default carrier for calls for which no carrier is specified.

Call path establishment from an end office at which a call is originating to the carrier's office is accomplished via a multifrequency signaling scheme. If the call is an international call or the route is an indirect route to a carrier via an access tandem, following seizure of a trunk the end office outpulses thereon a first sequence of information that characterizes the subsequent route that the call should take, including identity of the interexchange or international carrier. After receiving a wink responsive to the first sequence, the end office outpulses a second sequence. If the call is a domestic call routed directly to a carrier, following seizure of the trunk the end office begins outpulsing with the second sequence. The second sequence contains information characterizing the source of the call, such as information on the class of service of the calling terminal and ANI (automated number identification). Following the second sequence, the end office outpulses a third sequence of information characterizing the destination of the call, i.e., the called number, if such information is available. The end office then awaits receipt of an acknowledgment wink indicative of receipt by the interexchange carrier of the second and selectively the third sequences. Upon receiving the acknowledgment wink, the end office cuts-through the call path to the trunk.

Bimonte et al., U.S. Pat. No. 4,577,066 contains a similar disclosure to the Friedes et al., and Riley patents. The patent discusses routing a telephone call by selecting a plurality of possible routes as a function of the carrier designated for the call, and then selecting one of the possible routes as a function of characteristics associated with the call. The call characteristics that affect route selection are selected from class-of-service characteristics of the originating terminal link, characteristics of the called number, and characteristics of the incoming path of the call.

Harlow, U.S. Pat. No. 5,206,901 discloses use of an Intelligent Network to translate the directory number of an incoming call into one or more identifications of lines served by a local switching system, and one or more directory numbers not served by the local switching system. The system provides both landline telephone services and mobile telephone services.

Bissell et al., U.S. Pat. No. 5,243,645 discloses an intelligent network (IN) type system for forwarding a traveling subscriber's incoming calls to a different location identified by an automatic registration performed when the subscriber engages in a business transaction or activity that indicates his or her location. The transaction/activity can be any action that initiates updating of the electronic data base with information that directly or indirectly indicates the subscriber's identity and whereabouts. Examples include the use of a credit card at a location such as a hotel or airport, the making of a long distance telephone call with a credit card that identifies the subscriber or the use of an Automated Teller Machine (ATM).

Gutierrez et al., U.S. Pat. No. 5,481,603 discloses an intelligent network with selective routing of queries among a plurality of network control point (NCP) databases. Each end office switch has an associated global title translation (GTT) database, implemented, for example, as an element of a CNI ring interface to the SS7 (signaling system 7) signaling links. When a switch receives a call that requires intelligent call processing, such as a "software defined network" (SDN) call or an 800 call, the switch routes a query to the associated GTT database. This query fully identifies the calling station, for example by its 10 digit telephone number. The GTT database uses the calling station identification to identify the particular NCP in the telecommunications network that contains the appropriate record for completing the call. Assuming that the GTT database includes an identification of the NCP, the GTT database provides that information to the switch. The switch subsequently queries the particular NCP directly, to obtain the call processing information necessary to complete the call.

If the GTT database associated with the particular switch does not contain an appropriate entry, or an error condition exists, the GTT database so informs the switch. In response, the switch launches a further query to a centralized database, called a "universal global translation" (UGT) database. The UGT database stores appropriate GTT translations identifying the correct NCP database for each subscriber. In response to the query from the switch, the UGT database retrieves information identifying the customer ID and the particular NCP in the telecommunications network that contains the appropriate record for completing the call, and provides this information to the originating switch. The switch subsequently queries the particular NCP directly, to obtain the call processing information necessary to complete the call.

In the case where the GTT database did not include the appropriate record, the information obtained from the UGT database is also provided to and stored in the GTT database. Thus, the GTT database is "self provisioning", in that it will thereafter contain the appropriate information to avoid another query to the UGT database when the same calling station originates a subsequent call.

The Problem

While the systems and methods which have been discussed above suggest varying methodologies which may be applicable to provide features of number portability, none presents a system for expedient implementation of such a service in a manner which lends itself to widespread adoption with a minimum of alteration of telephone networks involved.

The Invention

A. Objects of the Invention

It is an object of the invention to provide a system and methodology for providing efficient and economical number portability for multi-carrier telephone networks operating over large geographic regions.

It is another object of the invention to provide a system and database method of number portability using a readily established and virtually universally accessible database or system of databases and network for accessing such databases.

It is yet another object of the invention to provide a system and database method of number portability using a database or system of databases in the Internet.

It is yet another object of the invention to provide a system and database method of number portability using a database or system of databases in a wide area packet internetwork to obviate and avoid the problems previously encountered in attempts to mesh the control networks or plural carriers.

It is another object of the invention to provide a system and methodology for providing both-inter carrier and interexchange number portability regardless of whether one or plural carriers are involved.

It is yet another object of the invention to provide a system and database method of number portability using a database or system of databases in the Internet in conjunction with either or both common channel signaling or in band signaling.

It is another object of the invention to provide a system and methodology for providing number portability which is usable in combinations of networks wherein a connection with the desired party does not rely solely on use of telephone networks.

It is another object of the invention to provide a system and methodology for providing number portability which is usable to establish voice communication with users who are reachable only through non-telephone networks, such as the Internet.

B. Summary of the Invention

According to the invention the dialing of a directory number which has been ported triggers an intelligent network (IN) signal which is directed to a gateway router to the Internet. From the Internet gateway router the signal is transmitted to a database or series of databases in the Internet. This database or databases return call set up directions which are then used by the originating network to establish a voice link to the station having the ported number. The intelligent network signal may be transmitted from a signal switching point (SSP) in the originating network to a signal transfer point (STP) and signal control point (SCP) to the Internet gateway router.

Alternatively the intelligent network signal may be so coded as to proceed directly from the signal transfer point to the Internet gateway router. From the Internet gateway router the signal is directed to an Internet database where a real number for the ported number is obtained. This is transmitted back to the signal switching point, which then uses the real number to complete the connection. In yet another situation, where a number has been ported to a station that is connected only to the Internet, the Internet database may provide an address, such as, for example, www.xxxxxxxx.tel. This address is then used to establish a link through the Internet between the originating Internet gateway router and a terminating Internet gateway router determined by the address www.xxxxxxxx.tel, and thence to the ported station. In this instance the Internet gateway routers handle both the signaling and the voice connection.

The use of an Internet database or databases facilitates a greater universality and applicability of the number portability system. Both common channel signaling and in band signaling may be utilized. The new arrangement facilitates the use of address systems which transcend existing telecommunications numbering systems. The Internet is virtually universally accessible and can ameliorate requirements for interfacing different types of signaling parameters which may be used by different carriers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF FIGURES OR DRAWINGS

DESCRIPTION OF THE INVENTION

Figure 1:
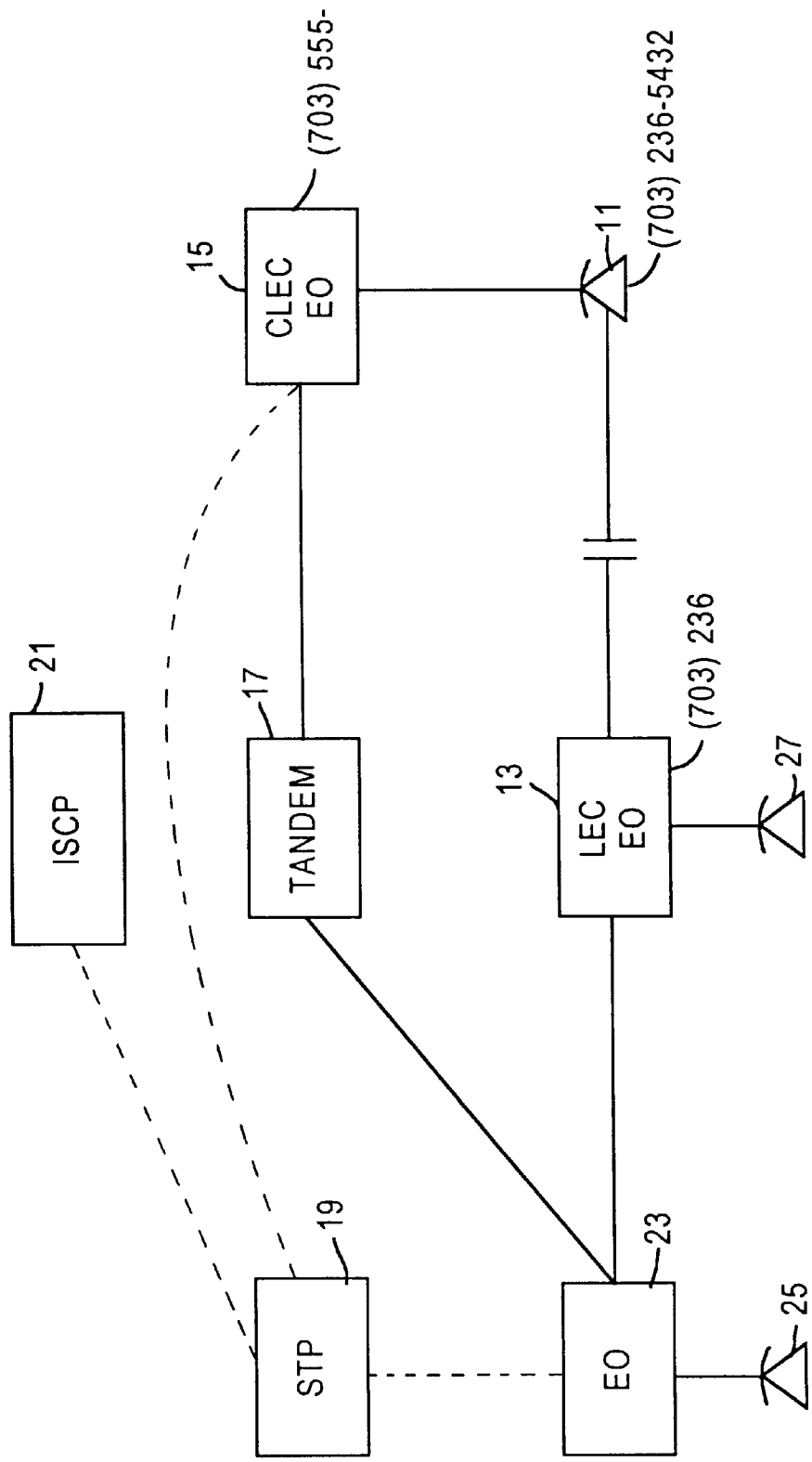
FIG. 1 is a simplified block diagram of the architecture of one of the above described number portability proposals which apparently would be acceptable to the Federal Communications Commission (FCC).

Referring to FIG. 1 there is shown a simplified block diagram of one proposed method for providing number portability between local exchange carriers. That figure shows a telephone network wherein a customer at station 11 may obtain local exchange telephone service from either a local exchange carrier (LEC) 13 or a competing local exchange carrier (CLEC) 15. In the illustrated example, the customer at station 11 originally received service through the LEC end office 13, however, the customer has now selected the competing carrier for local service. Accordingly, the station 11 now connects to the CLEC end office 15. The CLEC end office 15 may connect through trunk circuits to each LEC end office in the area of service. Alternatively, it may be more economical for carriers to utilize a trunk connection from the CLEC end office 15 to an access tandem, such as the tandem 17. The CLEC end office 15 also connects into the common channel interoffice signaling network (CCIS), at least for the exchange of call-setup related signaling messages.

The LEC end office 13 has an assigned area code (NPA) and exchange code (NXX) in accord with the North American Number Plan (NANP). From the range of numbers available with that NPA-NXX code, the subscriber originally had an assigned ten-digit telephone number (NPA-NXX-XXXX). By way of example, if the LEC end office has the area code and exchange code of 703-236, the customer at station 11 therefore may have a telephone number of 703-236-5432.

The CLEC end office 15 will similarly have an assigned NPA-NXX, and new customers of the CLEC will receive telephone numbers including that NPA-NXX. However, when the existing customer of the LEC decides to change local service over to the CLEC, the customer will be provided with number portability, i.e., will be able to take or 'port' the existing number over to the CLEC. As such, the customer having the existing telephone number must be able to receive incoming calls to the old NPA-NXX-XXXX number through a switch having a different NPA-NXX. In the illustrated example, assume that the CLEC end office 15 has an NPA-NXX of 703-555. The 703-236 code is not assigned to the office 15, but the network must route calls for telephone numbers with that code through the office 15 having the 703-555 NPA-NXX code.

The implementation which apparently is currently preferred by the CLECs and also apparently by the FCC involves querying a routing database by the originating office for all calls to an NPA-NXX from which any number (s) has been ported. The database returns a Local Routing Number (LRN) for use in routing the calls to the correct CLEC end office 15. The logical site for such a database in an implementation such as shown in FIG. 1 would be in the signal control point (SCP) or an integrated signal control point (ISCP) 21.

Figure 2:
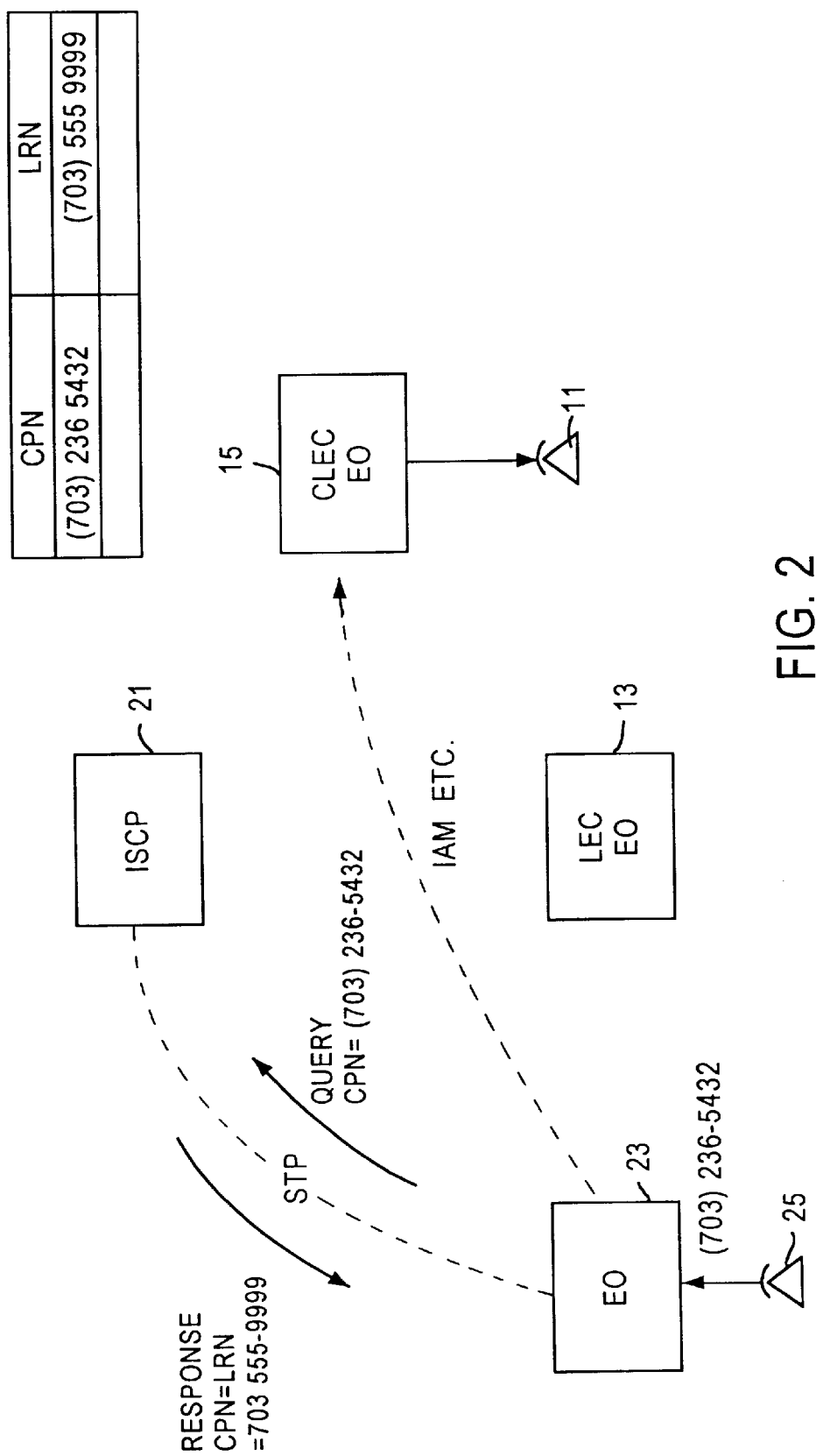
FIG. 2 is a simplified block diagram of the network of FIG. 1 showing the exchange of signaling messages used to set up an inter-office call to a ported number.

FIG. 2 is a diagram of the network, similar to FIG. 1, but showing the exchange of signaling messages used to set up an inter-office call to a ported number using the basic LRN methodology. Assume that the caller at station 25 dials the ported telephone number 236-5432. In the originating end office 23, a trigger has been set against the NPA-NXX codes (236 and/or 703-236) for the LEC end office 13. Detection of the dialing of the 236 code therefore triggers AIN processing by the end office 23. The end office 23 suspends call processing and launches a Transaction Capabilities Applications Protocol (TCAP) query. The TCAP query goes through a signaling transfer point (STP) 19 to the Integrated Services Control Point (ISCP) 21 (see FIG. 1).

The TCAP query includes a variety of data fields containing information about the call. For purposes of this discussion, the significant field in the query is the called party number field (CPN). In the initial query to the ISCP 21, the CPN field contains the dialed number (236-5432 or 703-236-5432).

For number portability, one number in the range of numbers assigned to the CLEC end office 15 is designated as a local routing number (LRN). In the example shown in FIGS. 1 and 2, assume that the LRN for the end office 15 is 703-555-9999. The ISCP 21 will have a table translating all ported numbers into the LRN for the CLEC end office serving the telephone line of the portable number customer. In the example, the table translates 703-236-5432 into 703-555-9999. The table will include no entries for numbers still resident in the LEC end office 13 having the called party number NPA-NXX, i.e., for numbers not ported.

In the example under consideration, the called number is a ported number, and the table contains an entry. The ISCP therefore formulates a TCAP response message based on the number translation. Specifically, the ISCP 21 formulates a TCAP response message with the LRN placed in the CPN field of the response. In the example, the CPN in the response is 703-555-9999, the LRN of the CLEC end office 15. The ISCP 21 transmits the response message back through the STP 19 to the originating end office 23.

Upon receipt of the response message, the end office 23 resumes its processing of the call, based on the information contained in the response message. In particular, the end office 23 uses the CPN number from the response message to route the call in an otherwise normal manner. Since the dialed number was a ported number, the CPN in the response message is an LRN. In the example, the CPN in the response is 703-555-9999. The originating end office 23 utilizes the LRN to route the call to the CLEC end office 15.

Routing of the call to the CLEC end office 15 includes a transmission and reception of a number of SS7 protocol interoffice signaling messages by the originating end office 23. The first of these messages is an Initial Address Message (IAM) transmitted from the originating end office to the terminating end office 15. For a ported number call, the IAM message will contain the LRN (703-555-9999) in the CPN field. The IAM message also includes a generic address parameter (GAP) field. The originating end office 23 places the actual destination number (703-237-5432) in the GAP field of the IAM, for each call to a ported number as indicated by the presence of an LRN in the response from the ISCP 21. The originating end office 23 also sets the m-bit in the forward call indicator parameter of the IAM to '1', to indicate to any subsequent switch in the call path that the number portability query has already been completed for this call.

The CLEC end office 15 will recognize the IAM message with the LRN in the CPN field as a message relating to a call to a ported number, therefore the CLEC end office 15 will utilize the number in the GAP field as the actual destination number. After the IAM message, the CLEC end office 15 will process the call in the normal manner to determine availability or busy status and ring and complete the call to the station 11, if available.

If the caller calls a number that normally resides within the exchange that serves the calling party, the internal switch translations will determine how the call is routed. For example, if a caller at station 27 (FIG. 1) calls another number with the NPA of 236, the LEC end office 13 utilizes its internal translations. If the switch still provides telephone service for that number, the end office 13 completes the call in the normal manner. If the call is to a ported number, such as 236-5432, then the switch translation will provide the LRN (e.g., 555-9999). The end office 13 then routes the call through the CLEC end office 15 using the LRN as the CPN and using the destination number as the GAP, in the same manner as for the exemplary call from station 25 to station 11 discussed above.

However, not all local exchange carriers currently operating in the United States have advanced intelligent networks (AINs), SCPs, or ISCPs. In addition the complexity of reaching the correct control point in whatever control point may be established can become cumbersome depending on the geographical distance between the old and new end offices. As a result considerable investment in network planning and plant could be required. These problems, among others, are addressed by the present invention.

Figure 3:
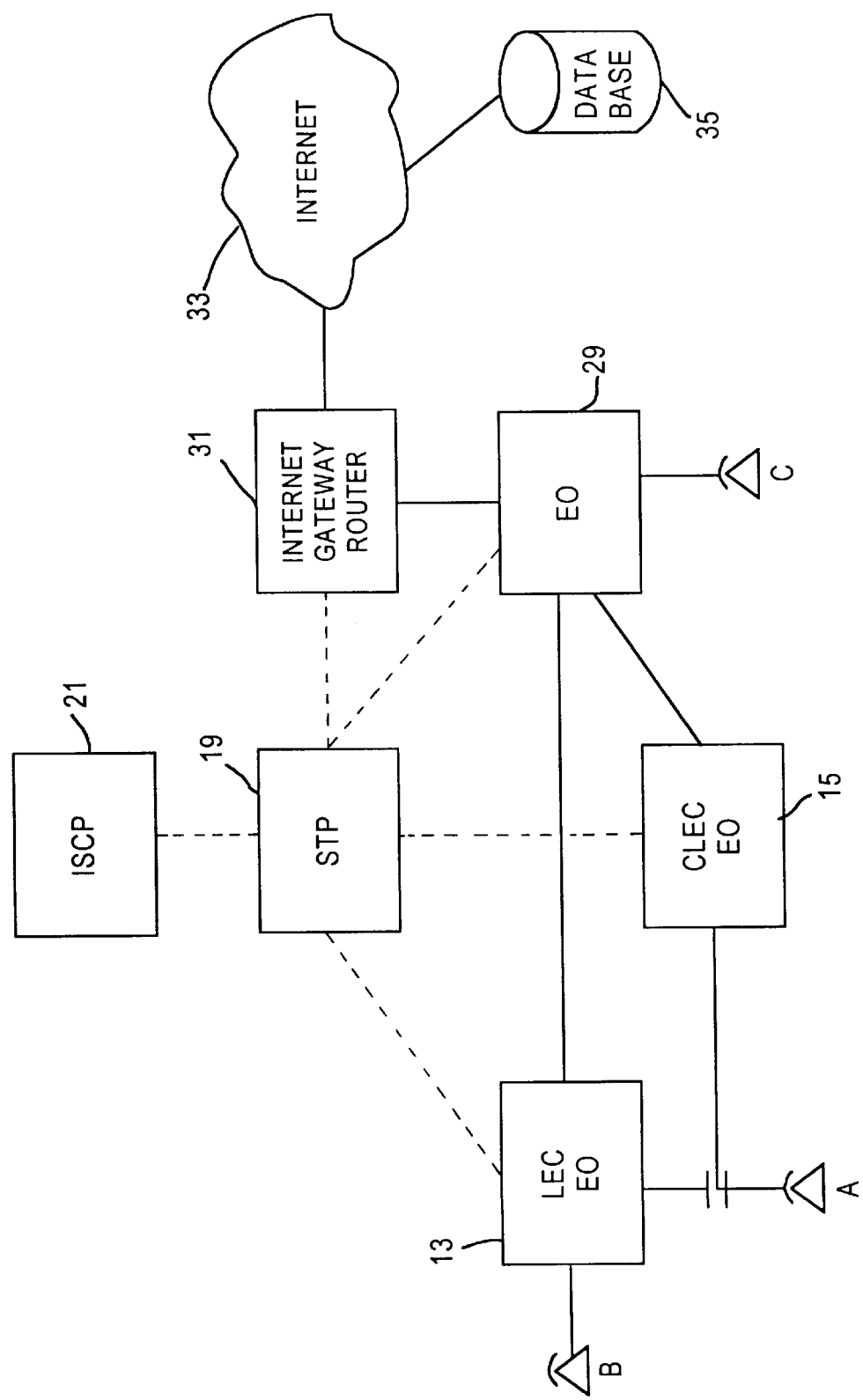
FIG. 3 is a simplified block diagram of the architecture of a network system arranged to implement one preferred embodiment of the invention.

Referring to FIG. 3 there is shown one preferred embodiment of the invention. According to this arrangement a telephone network is provided wherein a customer at station A may obtain local exchange telephone service from either a local exchange carrier (LEC) 13 or a competing local exchange carrier (CLEC) 15. In the illustrated example, the customer at station A originally received service through the LEC end office 13. However, the customer has now selected the competing carrier CLEC 15 for local service. Accordingly, the station A now connects to the CLEC end office 15. The CLEC end office 15 may connect through a tandem switch or trunk circuits to each LEC end office in the area of service. However, for convenience the end office 15 is shown connected to the end office 29. In this example the CLEC end office 15 is also shown as connected into the common channel interoffice signaling network via STP 19 and ISCP 21.

According to the invention the network is provided with an Internet Gateway Router (IGR) 31, which is connected to the STP 19 by a data link and to the Internet, shown as cloud 33. For purposes to be described, the Internet Gateway Router 31 is also connected by a voice link to the end office 29. Also connected to the Internet 33 is an address and telephone number database 35. The database 35 stores telephone number translations of the same general type as the ISCP database in addition to Internet addresses. The storage of addresses may be similar in nature to data stored in the Internet database described in parent application Ser. No. 08/670,908, filed Jun. 26, 1996. Thus the database 35 may be distributed and operate in a manner similar to the distributed database that is used in the Domain Name Service (DNS) servers in the Internet, as is described in further detail hereinafter. The Internet Gateway Router may also be similar in nature to that described in the parent application.

The Internet utilizes Transmission Control Protocol (TCP)/Internet Protocol (IP) or TCP/IP.

A Defense Data Network (DDN) standard establishes criteria for an Internet Protocol (IP) which supports the interconnection of communication LANs.

It introduces the Internet Protocol's role and purpose, defines the services provided to users, and specifies the mechanisms needed to support those services. The standard also defines the services required of the lower protocol layer, describes the upper and lower interfaces, and outlines the execution environment services need for implementation.

A Transmission Control Protocol (TCP) is a transport protocol providing connection-oriented, end-to-end reliable data transmission in packet-switched computer LANs and internetworks.

The Internet Protocol (IP) and the Transmission Control Protocol (TCP) are mandatory for use in all DoD packet switching networks which connect or have the potential for utilizing connectivity across network or subnetwork boundaries. Network elements, such as hosts, front-ends, gateways, etc., within such networks which are to be used for internetting must implement TCP/IP.

The Internet Protocol is designed to interconnect packet-switched communication LANs to form an internetwork. The IP transmits blocks of data, called Internet datagrams, from sources to destinations throughout the Internet. Sources and destinations are hosts located on either the same subnetwork or on connected LANs. The IP is intentionally limited in scope to provide the basic functions necessary to deliver a block of data. Each Internet datagram is an independent entity unrelated to any other Internet datagrams. The IP does not create connections or logical circuits and has no mechanisms to promote data reliability, flow control, sequencing, or other services commonly found in virtual circuit protocols.

The DDN standard specifies a host IP. As defined in the DoD architectural model, the Internet Protocol resides in the internetwork layer. Thus, the IP provides services to transport layer protocols and relies on the services of the lower network protocol. In each gateway, a system interconnecting two or more LANs, an IP resides above two or more LAN's protocol entities. Gateways implement IP to forward datagrams between LANs. Gateways also implement a routing protocol to coordinate signaling and other Internet control information.

Various Network Access Protocols reside below the IP and may include, by example, an Ethernet protocol or an X.25 protocol.

Figure 4:
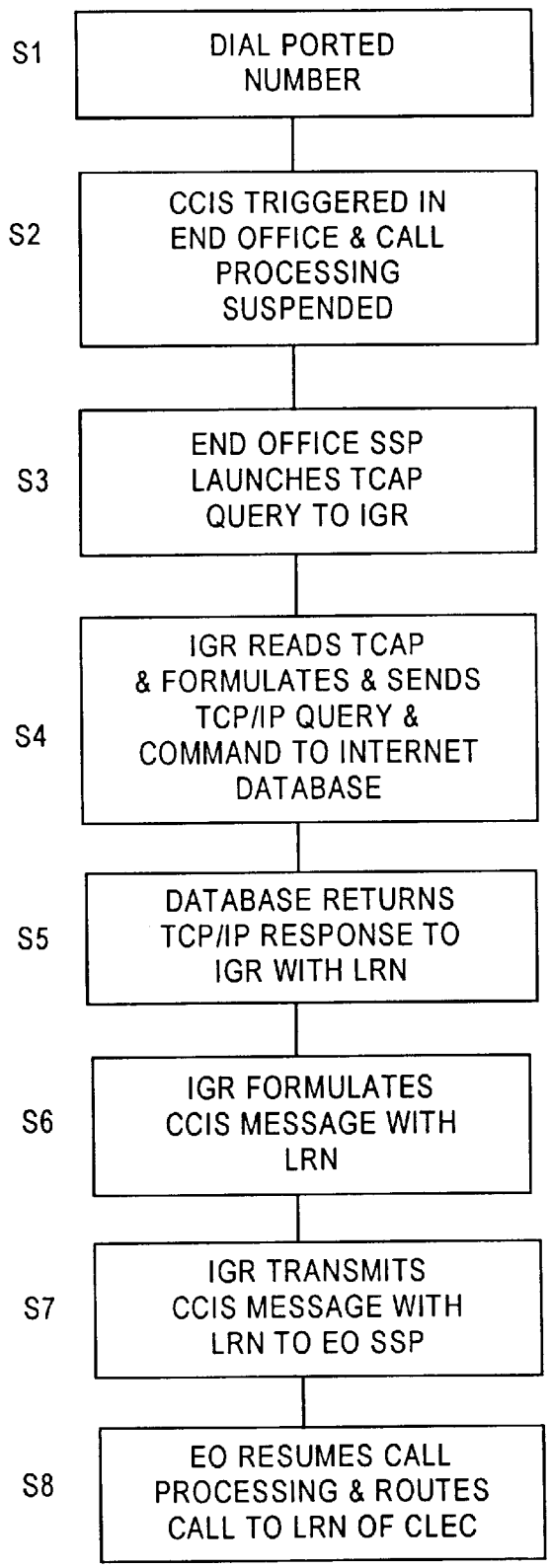
FIG. 4 is a simplified flow chart diagram of the operation of the embodiment of FIG. 3.

In completion of a call of the type described by way of example in connection with FIGS. 1 and 2 the system of the embodiment of the invention shown in FIG. 3 may operate in the following manner. FIG. 4 is a simplified flow chart diagram of the operation. The chart shows the exchange of signaling messages used to set up an interoffice call to a ported number using one embodiment of the invention.

Assume that the caller at station B dials the ported telephone number (703) 236-5432 at Si. In the originating end office 13, a trigger has been set against the NPA-NXX codes (236 and/or 703-236) for the LEC end office 13. Detection of the dialing of the 236 code therefore triggers common channel signaling processing by the end office 13. The end office 13 suspends call processing at S2 and launches a Transaction Capabilities Applications Protocol (TCAP) type query at S3. According to the invention the TCAP type query goes through a signaling transfer point (STP) 19 to the Internet Gateway Router 31.

The TCAP query includes a variety of data fields containing information about the call. For purposes of this discussion, the significant field in the query is the called party number field (CPN). The Internet Gateway Router thereupon performs a dip or look-up in the database 35. In the initial query to the Internet database 35, the CPN field contains the dialed number (236-5432 or 703-236-5432).

As described in the preceding example, one number in the range of numbers assigned to the CLEC end office 15 is designated as a local routing number (LRN). In the example it is assumed that the LRN for the end office 15 is 703-555-9999. The Internet database will have a table translating all ported numbers into the LRN for the CLEC end office serving the telephone line of the ported number customer. In the example, the table translates 703-236-5432 into 703-555-9999. The table will include no entries for numbers still resident in the LEC end office having the called party number NPA-NXX, i.e., for numbers not ported. In the example under consideration, the called number is a ported number, and the Internet database table contains an entry.

The Internet Gateway Router translates the protocol of the received SS7 query and addresses a TCP/IP query to the database 35 at S4. This query is transmitted and seeks from the database 35 the LRN for the CLEC for the ported number. This is indicated at S4. The database performs a dip, obtains the LRN, and returns a TCP/IP response to the Internet Gateway Router 31. At S5 the Gateway Router obtains this TCP/IP response containing the requested LRN from the database. At S6 the Internet Gateway Router 31 formulates a TCAP response message including the LRN based on the TCP/IP response. In this example, the Internet Gateway Router 31 formulates a TCAP type response message with the LRN placed in the CPN field of the response. In the example, the CPN in the response is 703-555-9999, the LRN of the CLEC end office 15. The Internet Gateway Router 31 transmits the response message back through the STP 19 to the originating end office 13 in SS7 format at S7.

Upon receipt of the response message, the end office 13 resumes its processing of the call, based on the information contained in the response message. In particular, the end office 13 uses the CPN number from the response message to route the call in an otherwise normal manner. Since the dialed number was a ported number, the CPN in the response message is an LRN. In the example, the CPN in the response is 703-555-9999. The originating end office 13 utilizes the LRN to route the call to the CLEC end office 15 at S8.

Routing of the call to the CLEC end office 15 includes a transmission and reception of a number of common channel signaling messages by the originating end office 13. The first of these messages is an Initial Address Message (IAM) type message transmitted from the originating end office to the terminating end office 15. For a ported number call, the IAM message will contain the LRN (703-555-9999) in the CPN field. The IAM message also includes a generic address parameter (GAP) field. The originating end office 13 places the actual destination number (703-237-5432) in the GAP field of the IAM, for each call to a ported number as indicated by the presence of an LRN in the response from the Internet Gateway Router 31. The originating end office 13 also sets the m-bit in the forward call indicator parameter of the IAM to '1', to indicate to any subsequent switch in the call path that the number portability query has already been completed for this call.

The CLEC end office 15 will recognize the IAM message with the LRN in the CPN field as a message relating to a call to a ported number, therefore the CLEC end office 15 will utilize the number in the GAP field as the actual destination number. After the IAM message, the CLEC end office 15 will process the call in the normal manner to determine availability or busy status and ring and complete the call to the station A, if available.

If the caller calls a number that normally resides within the exchange that serves the calling party, the internal switch translations will determine how the call is routed. For example, if a caller at station B calls another number with the NPA of 236, the LEC end office 13 utilizes its internal translations. If the switch still provides telephone service for that number, the end office 13 completes the call in the normal manner. If the call is to a ported number, such as 236-5432, then the switch translation will provide the LRN (e.g., 555-9999). The end office 13 then routes the call through the CLEC end office 15 using the LRN as the CPN and using the destination number as the GAP, in the same manner as for the exemplary call from station B to station A discussed above.

Figure 5:
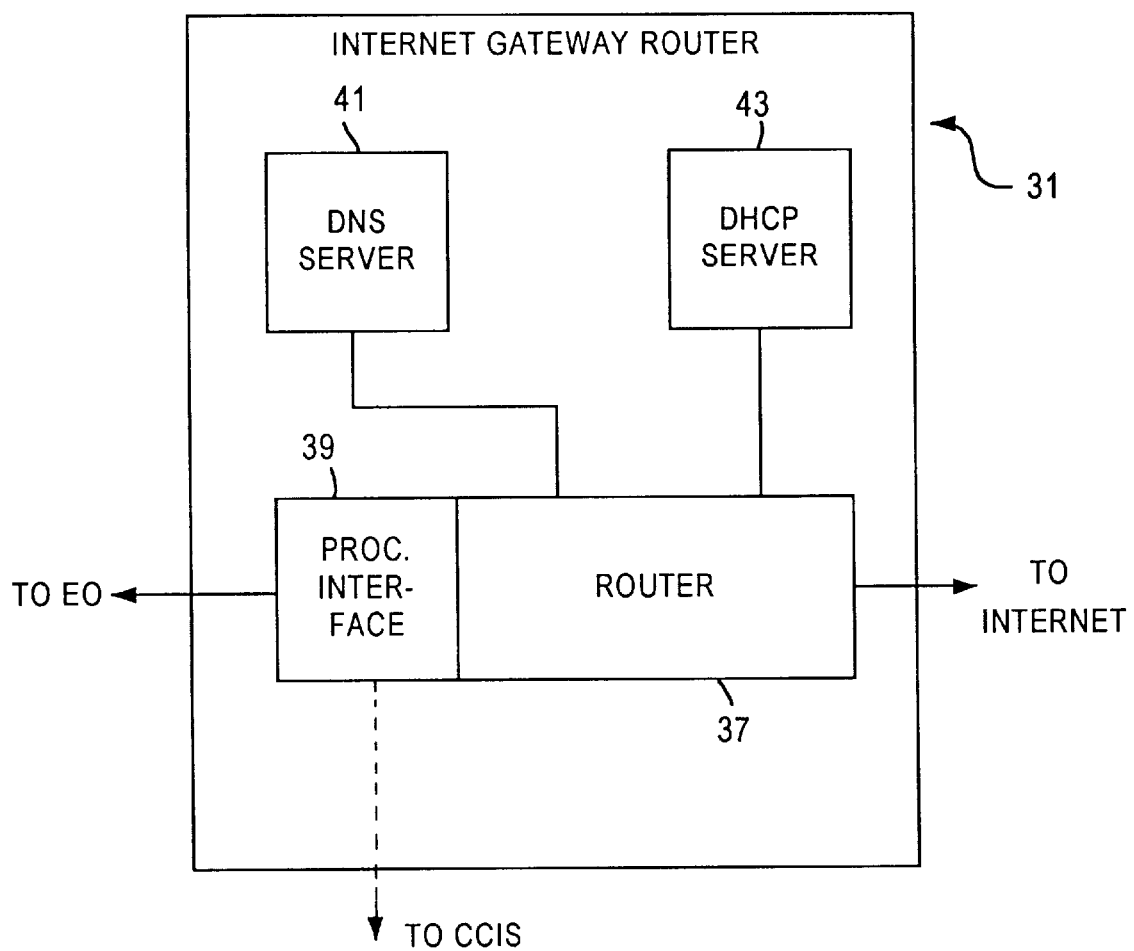
FIG. 5 is a simplified block diagram showing one form of gateway router for use with the invention.

The Internet Gateway Router 31 may be of the same type as described in the parent application. Such a gateway router is shown in FIG. 5. The Internet Gateway Router, generally indicated at 31, includes a router 37 of the type now generally used in Internet practice, such as shown in FIG. 1 of parent application Ser. No. 08/670,908, which is incorporated for reference herein in its entirety. For performing some functions which may be utilized in the system the router may be provided with an interface with processing capability as illustratively shown at 39. Connected to the router are a Domain Name Service (DNS) server 41 and a Dynamic Host Configuration Protocol (DHCP) server 43 of the type conventionally used by Internet Service Providers (ISPs) in existing Internet Service. The router interface is connected to the central office and to the CCIS network while the router is connected to the Internet.

It will be appreciated by those skilled in the art that the DNS is a distributed database that holds the domain names and IP addresses of all the registered systems on the Internet. With Internet servers located all over the world, DNS translates the names to addresses and back. Individual DNS servers contain only a limited amount of information, because they know where to find details on domains they have yet to encounter. If an individual server does not contain information for a specific domain name, it passes the request along the hierarchy of servers until the information is found. In practice this means that the request can be handled by any number of servers in the constantly changing Internet. The server that originally made the request will cache the information to satisfy future requests without the need to go to an authoritative server, i.e., a server which has the desired information. It will also be understood that if the IP address is initially stated in its ultimate number form, the DNS translation is unnecessary.

It is an advantage of the invention that number portability may be provided with respect to numbers assigned to stations which can be reached only through the Internet. Among other advantages, this feature provides operability over greatly expanded geographic areas which may be internatioanal. The use of the hierarchical DNS techniques for the DNS and for the database 31 permits virtually unlimited expansion possibilities.

Figure 6:
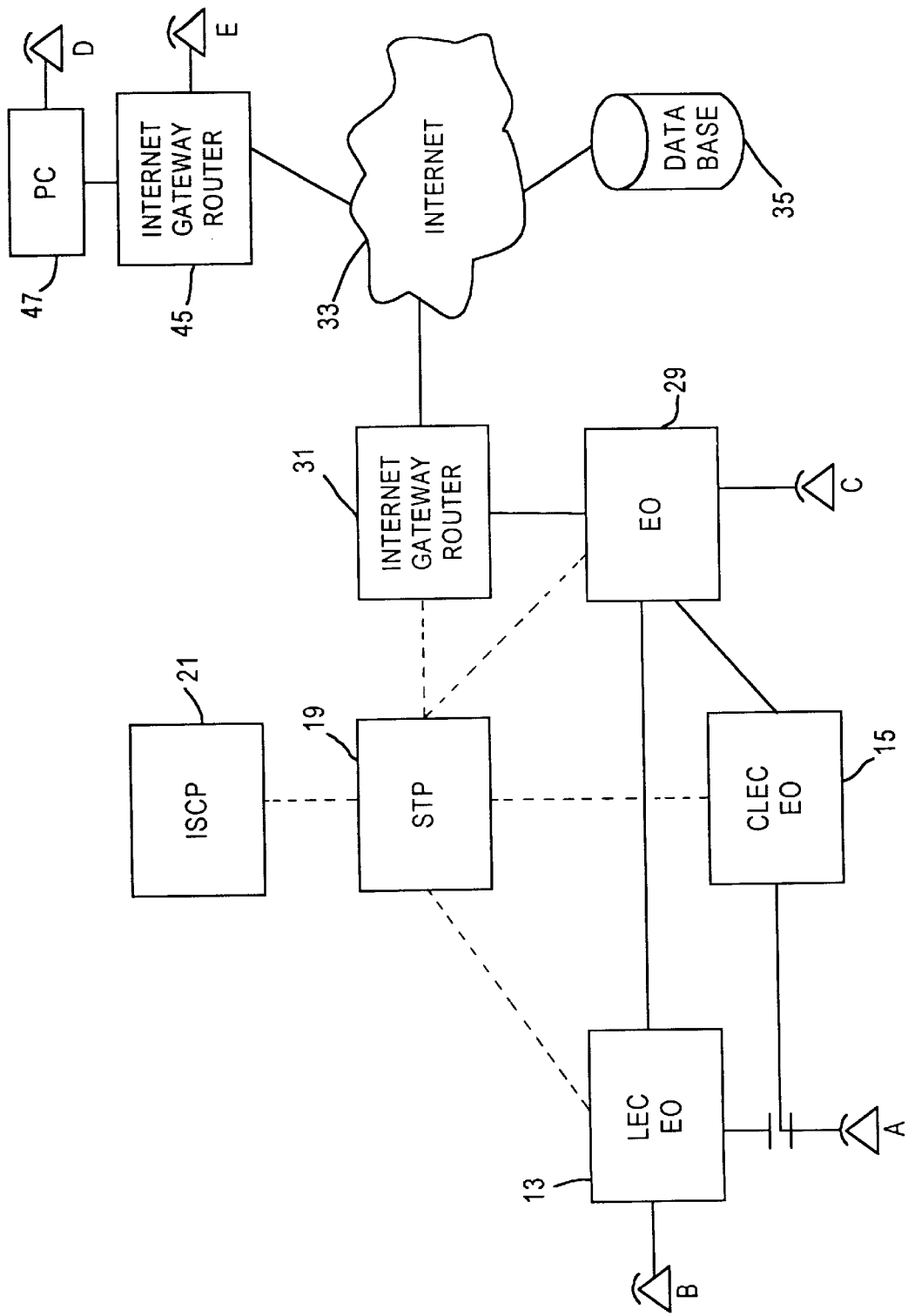
FIG. 6 is an illustration of a network similar to that in FIG. 3 showing an embodiment of the invention which implements number portability in a situation where the station to which the ported number is assigned may be reached only through the non-telephone company network.

According to a first embodiment of this feature of the invention there is shown in FIG. 6 a network similar to that illustrated in FIG. 3 wherein like reference numerals are used. In this arrangement a second Internet Gateway Router 45 is connected to the Internet and to a station D which is connected directly to the Internet Gateway Router 45 through a processor such as a PC 47. Station D may be reached only through the Internet. The station D may be a plain old telephone station (POTS) or may constitute a computer microphone and speaker or headset arrangement, such as the type described in the parent application. In this embodiment it is assumed that the subscriber customer formerly had subscribed to telephone service from an LEC and had a conventional DNA-NXX-XXXX telephone number assigned. By way of example, it is assumed that the former subscriber has moved and presently desires an Internet only telephone connection to which his/her DNA-NXX-XXXX number will be ported.

According to this embodiment of the invention the subscriber is possessed of a domain name Internet address and maintains his/her processor or PC in a continuously energized condition. In this embodiment of the invention the Internet database 35 is provided with a translation table or tables which not only provide translations from telephone number to telephone number but also provide translations from ported telephone number to Internet addresses. In this instance the translation table for the ported number for the station D provides an Internet address for the processor or PC 47. A simplified flow chart of the operation is presented in FIG. 7. Such operation proceeds in the following manner.

At S1 a caller dials the ported number DNA-NXX-XXXX of the subscriber at station D. This triggers the suspension of the call at S2. At S3 the originating end office switching system and associated SSP transmit a query TCAP message to the Internet Gateway Router 31. This message includes the ported number that was dialed. At S4 the Internet Gateway Router formulates and transmits a TCP/IP query or command through the Internet to the database 35, seeking retrieval of the present number of the subscriber. The database performs a data dip, i.e., searches its tables, and dispatches a response to the inquiring Internet Gateway Router 31. This response forwards the Internet address corresponding to the ported number. This is shown at S5. If the address returned by the database is in the form of a domain name, the Internet Gateway Router performs a translation to the Internet address at S6.

At S7 the originating Internet Gateway Router 31 formulates or assembles a TCP/IP packet (or packets) message and transmits the message through the Internet to the destination Internet Gateway Router 45. This message includes the address of the destination Internet Gateway Router 45, the originating Internet Gateway Router 31, and the Internet address of the subscriber at station D. The destination Internet Gateway Router 45 receives the message at S8 and queries the processor or PC 47 to determine if the called party is available. If the party is not available, signaling messages to that effect are returned through the Internet and common channel signaling network to the calling end office SSP in inverse fashion at S9. The calling end office thereupon returns a busy or not available prompt to the caller at S10. If the called party is available a TCP/IP linkage from originating Internet Gateway Router 31 to destination Internet Gateway Router 45 is established at S11. The Internet Gateway Routers at the originating and terminating ends perform the translation from voice to TCP/IP packets to voice signals and a voice path is established through end office 29 and originating end office 13 at S12. The conversation thereupon proceeds at S13.

Figure 7:
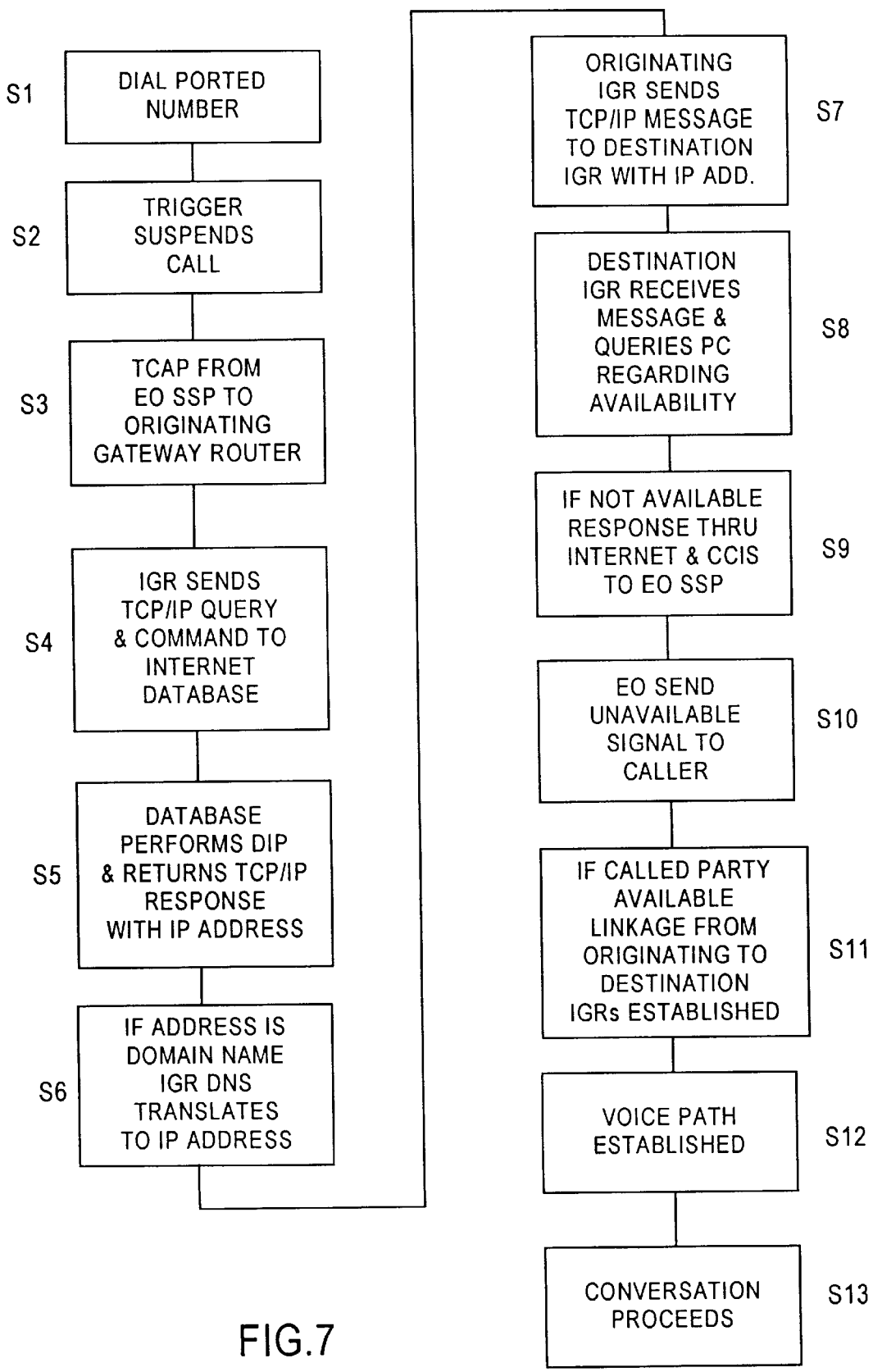
FIG. 7 is a simplified flow chart of the operation of the system illustrated in FIG. 7.

While the embodiment of the invention shown in FIGS. 6 and 7 utilized a processor or PC 47 at the premises of the subscriber, it is also a feature of the invention that the processing which occurs at that site may alternatively be performed at the site of the Internet Gateway Router and a voice message delivered to the telephone station D. Such an embodiment is illustrated in FIG. 6 by station E connected directly to Internet Gateway Router 45. The destination Internet Gateway Router 45 performs the processing previously performed in processor or PC 47 in FIG. 6.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of communicating with a ported telephone number in a switched telecommunication network comprising the steps of:

dialing from a calling station linked to a calling end office switching system in said switched telecommunication network a telephone number which has been ported from a first end office switching system in said switched telecommunication network to a second end office switching system in said switched telecommunication network;

responsive to said dialing, transmitting a first signaling message in a telecommunications network signaling protocol to an interface to a public wide area packet network using as its basic signaling protocol a non-telecommunications network protocol;

translating said first signaling message in telecommunications network signaling protocol to said non-telecommunications network protocol and transmitting said translated message to a database linked to said public wide area packet network;

retrieving from said database a number identifying said second end office switching system;

using said number identifying said second end office switching system and formulating a second signaling message including said number identifying said second end office switching system;

transmitting said second signaling message including said number identifying said second end office switching system via said public wide area packet network to said calling end office switching system; and using said number identifying said second end office switching system to establish a communication connection between said calling station and a station designated by said ported telephone number linked to said second end office switching system to which said telephone number has been ported.

2. A method according to claim 1 wherein said wide area packet network comprises the Internet.

3. A method according to claim 1 wherein said non-telecommunications network protocol is Transmission Control Protocol/Internet Protocol (TCP/IP).

4. A method according to claim 1 wherein said translation of said first signaling message to said non-telecommunications network protocol is performed at an interface between said switched telecommunication network and said non-telecommunications network.

5. A method according to claim 4 wherein said interface comprises an internetwork gateway router.

6. A method according to claim 5 wherein said non-telecommunications network protocol comprises Transmission Control Protocol/Internet Protocol (TCP/IP).

7. A method according to claim 1 wherein said transmittal of said first signaling message in a telecommunications network protocol to said interface to said wide area packet network is via a common channel signaling network associated with said switched telecommunication network.

8. A method according to claim 7 wherein said first signaling message is routed through at least one signal transfer point in said common channel signaling network.

9. A method according to claim 7 wherein said common channel signaling network uses Signaling System 7 protocol.

10. A method according to claim 1 wherein said translated message to said database linked to said wide area packet network comprises one or more packets which include addressing in said non-telecommunications network protocol.

11. A method according to claim 10 wherein said packets have therein datagrams with addressing in said telecommunications network protocol.

12. A method according to claim 1 wherein said first signaling message in a telecommunications network protocol is triggered in said calling end office switching system by said dialing.

13. A method according to claim 1 wherein said route identifier includes an address in said wide area network.

14. A method according to claim 13 wherein said wide area network is the Internet.

15. A communications network comprising in combination:

a switched telecommunications network including a plurality of local exchange carrier networks, each of said local exchange carrier networks comprising end office switching systems connected by trunks and connected to customer stations served by the respective end office switching systems by local links between said end office switching systems and said customer stations;

each of said end office switching systems having an assigned area code (NPA) and exchange code (NXX) in accord with the North American Number Plan (NANP), and each of said customer stations having an assigned ten-digit telephone number (NAP-NXX=XXXX);

each of said local exchange carrier networks having a dedicated packet signaling network connected to said end office switching systems for controlling the selective interconnection of said customer stations through said end office switching systems and said trunks, said dedicated signaling network using a first signaling protocol;

a first customer station formerly served by a first of said end office switching systems and having a first exchange code (NXX) associated with said first end office switching system, currently served by a second of said end office switching systems by a local link thereto, said second end office switching system having a second exchange code (NXX) associated therewith, said customer station retaining said first exchange code (NXX) associated with said first end office switching system;

said switched telecommunications network comprising at least one gateway device coupled to the Internet and capable of translating between said first signaling protocol and an Internet protocol;

a database remote from said switched telecommunications network and connected to the Internet and having stored therein a translation between said first and second exchange codes associated with said first and second end office switching systems;

means in said telecommunications network responsive to the dialing of the ten-digit telephone number (NAP-NXX=XXXX) assigned to said first customer station for transmitting a query signal via said at least one of said packet signaling networks to said gateway device;

means for retrieving from said database said translation between said first and second exchange codes associated with said first and second end office switching systems and formulating a response signal and transmitting said signal from said gateway device to said at least one of said packet signaling networks to direct routing of a call through said switched telecommunications network responsive to said dialing of said ten-digit telephone number (NAP-NXX=XXXX) assigned to said first customer station.

16. A communications network according to claim 15 wherein said packet internetwork comprises the Internet.

17. A communications network according to claim 15 wherein said second signal protocol comprises Transmission Control Protocol/Internet Protocol (TCP/IP).

18. A communications network according to claim 15 wherein said at least one of said packet signaling networks includes a signal transfer point through which said response is routed.

19. A communications network according to claim 15 wherein said first and second end office switching systems are in the networks of different local carriers.

20. A communications network according to claim 19 wherein said first and second end office switching systems are geographically remote.

21. A method of communicating with a ported telephone number in a switched telecommunication network comprising the steps of:
dialing from a calling station linked to a calling end office switching system in said switched telecommunication network a telephone number which has been ported from a first end office switching system in said switched telecommunication network to a second end office switching system in said switched telecommunication network;
responsive to said dialing, transmitting a first signaling message in a telecommunications network signaling protocol to an Internet gateway interface using Internet protocol as its basic signaling protocol;
translating said first signaling message in telecommunications network signaling protocol to Internet protocol and transmitting said translated message to a database linked to the Internet;
retrieving from said database a number identifying said second end office switching system;
using said number identifying said second end office switching system and formulating a second signaling message including said number identifying said second end office switching system;
transmitting said second signaling message including said number identifying said second end office switching system to said switched telecommunications network; and
using said number identifying said second end office switching system to establish a communication connection between said calling station and a station designated by said ported telephone number linked to said second end office switching system to which said telephone number has been ported.

22. A method according to claim 21 wherein said wide area packet network comprises the Internet.

23. A method according to claim 21 wherein said non-telecommunications network protocol is Transmission Control Protocol/Internet Protocol (TCP/IP).

24. A method according to claim 21 wherein said translation of said first signaling message to said non-telecommunications network protocol is performed at an interface between said switched telecommunication network and said non-telecommunications network.

25. A method according to claim 24 wherein said interface comprises an internetwork gateway device.

26. A method according to claim 25 wherein said non-telecommunications network protocol comprises Transmission Control Protocol/Internet Protocol (TCP/IP).

27. A method according to claim 21 wherein said transmittal of said first signaling message in a telecommunications network protocol to said interface to said wide area packet network is via a common channel signaling network associated with said switched telecommunication network.

28. A method according to claim 27 wherein said first signaling message is routed through at least one signal transfer point in said common channel signaling network.

29. A method according to claim 28 wherein said common channel signaling network uses Signaling System 7 protocol.

30. A method according to claim 21 wherein said translated message to said database linked to said wide area packet network comprises one or more packets which include addressing in said non-telecommunications network protocol.

31. A method according to claim 30 wherein said packets have therein datagrams with addressing in said telecommunications network protocol.

32. A method according to claim 21 wherein said first signaling message in a telecommunications network protocol is triggered in said calling end office switching system by said dialing.

33. A method of communicating with a ported telephone number in a switched telecommunication network comprising the steps of:
dialing from a calling station linked to a calling end office switching system in said switched telecommunication network a telephone number which has been ported from an end office switching system of a first local exchange carrier in said switched telecommunication network to an end office of a second local exchange carrier;
responsive to said dialing, transmitting a first signaling message in a telecommunications network signaling protocol to an Internet interface using as its basic signaling protocol Internet protocol;
translating said first signaling message to Internet protocol and transmitting said translated message to a database linked to the Internet;
retrieving from said database a route identifier number identifying a routing path to a node through which the station identified by said ported number may be reached;
using said route identifier and formulating a second signaling message including said route identifier;
transmitting said second signaling message including said route identifier to said calling end office switching system; and
using said route identifier to establish a communication link between said calling station and said node.

34. A method according to claim 33 including the step of establishing a communication link between said calling station the station identified by said ported number through said node.

35. A method according to claim 34 wherein said node comprises an interface to said wide area packet network using as its basic signaling protocol a non-telecommunications network protocol.

36. A method according to claim 35 wherein said wide area packet network is the Internet.

37. A method according to claim 36 wherein said node comprises an Internet gateway router.

38. A method according to claim 34 wherein the signal protocol used in said communication link between said calling station and the station identified by said ported number through said node is Transmission Control Protocol/Internet Protocol (TCP/IP) into and out of said node.

39. A method according to claim 34 wherein the signal protocol used in said communication link between said calling station and the station identified by said ported number through said node is analog voice between said node and said station identified by said ported number.

40. A communications network comprising in combination:

a switched telecommunications network comprising end office switching systems connected by trunks and connected to customer stations served by the respective end office switching systems by local links between said end office switching systems and said customer stations;

each of said end office switching systems having an assigned area code (NPA) and exchange code (NXX) in accord with the North American Number Plan (NANP), and each of said customer stations having an assigned telephone number (NAP-NXX=XXXX);

said switched telecommunications network having a dedicated packet signaling network connected to said end office switching systems for controlling the selective interconnection of said customer stations through said end office switching systems and said trunks, said dedicated signaling network using a first signaling protocol;

a first customer station formerly served by a first of said end office switching systems and having a first exchange code (NXX) associated with said first end office switching system, said first customer station being currently served by a node and a local link connected thereto, said node not being connected to said first of said end office switching system through said switched telecommunications network;

a public wide area packet internetwork separate from said telecommunications network linking diverse local area networks, said public wide area packet internetwork using a second signaling protocol for linking said diverse local area networks;

said public wide area packet internetwork being connected to said switched telecommunications network via a gateway device capable of translating between said first and second protocols;

said node having an address in said public wide area packet internetwork;

a database connected to said public wide area packet internetwork and having stored therein a translation between said first exchange code associated with said first end office switching system and said address of said node;

means in said telecommunications network responsive to the dialing of the telephone number (NAP-NXX=XXXX) assigned to said first customer station for transmitting a query signal via said packet signaling network to said gateway device;

means in said public wide area packet internetwork for retrieving from said database said translation between said first exchange code associated with said first end office switching system and said address of said node and formulating a response signal and transmitting said response signal from said gateway device to said packet signaling network to direct routing of a call through said switched telecommunications network and through said public wide area packet internetwork responsive to said dialing of said telephone number (NAP-NXX=XXXX) assigned to said first customer station.

41. A communications network according to claim 40 wherein said wide area packet internetwork is the Internet.

42. A communications network comprising in combination:

a switched telecommunications network comprising end office switching systems connected to customer stations by local links between said end office switching systems and said customer stations;

each of said end office switching systems having an assigned exchange code (NXX) in accord with the North American Number Plan (NANP), and each of said customer stations having an assigned telephone number including one of said assigned exchange codes;

said switched telecommunications network having a dedicated packet signaling network connected to said end office switching systems for controlling the selective interconnection of said customer stations through said end office switching systems, said dedicated signaling network using a first signaling protocol;

a first customer station formerly served by a first of said end office switching systems and having a first exchange code (NXX) associated with said first end office switching system, said first customer station being currently served by a node and a local link connected thereto, said node not being connected to said first of said end office switching system through said switched telecommunications network;

a public wide area packet internetwork separate from said telecommunications network, said public wide area packet internetwork using a second signaling protocol; said public wide area packet internetwork being connected to said switched telecommunications network via a gateway device capable of translating between said first and second protocols;

said node having an address in said public wide area packet internetwork;

a database connected to said public wide area packet internetwork and having stored therein a translation between said first exchange code associated with said first of said end office switching systems and said address of said node;

means in said telecommunications network responsive to the dialing of said telephone number assigned to said first customer station for transmitting a query signal via said dedicated packet signaling network to said gateway device;

means in said public wide area packet internetwork for retrieving from said database said translation between said first exchange code associated with said first of said end office switching systems and said address of said node and formulating a response signal and transmitting said response signal from said gateway device to said dedicated packet signaling network to direct routing of a call through said switched telecommunications network and through said public wide area packet internetwork responsive to said dialing of said telephone number assigned to said first customer station.

43. A communications network according to claim 42 wherein said node comprises a gateway router.

44. A communications network according to claim 42 wherein said address of said node is an Internet address.

45. A communications network according to claim 42 wherein said database is a distributed hierarchical database.

46. A communications network comprising in combination:

a switched telecommunications network including a plurality of end office switching systems connected to customer stations served by the respective end office switching systems by local links between said end office switching systems and said customer stations;

each of said end office switching systems having an assigned exchange code (NXX) in accord with the North American Number Plan (NANP), and each of said customer stations having an assigned telephone number;

said switched telecommunications network having a dedicated packet signaling network connected to said end office switching systems for controlling the selective interconnection of said customer stations through said end office switching systems, said dedicated signaling network using a first signaling protocol;

a first customer station formerly served by a first of said end office switching systems of a first local exchange carrier and having a first exchange code (NXX) associated with said first end office switching system, said first customer station being currently served by a second of said end office switching systems of a second local exchange carrier by a local link thereto, said second end office switching system having a second exchange code (NXX) associated therewith, said first customer station retaining said first exchange code (NXX) associated with said first end office switching system;

a public wide area packet internetwork separate from said telecommunications network, said public wide area packet internetwork using a second signaling protocol;

said public wide area packet internetwork being connected to said switched telecommunications network via a gateway device capable of translating between said first and second protocols;

a database connected to said public wide area packet internetwork and having stored therein a translation between said first and second exchange codes associated with said first and second end office switching systems;

means in said telecommunications network responsive to the dialing of the telephone number assigned to said first customer station for transmitting a query signal via said dedicated packet signaling network to said gateway device;

means in said public wide area packet internetwork for retrieving from said database said translation between said first and second exchange codes associated with said first and second end office switching systems and formulating a response signal and transmitting said signal from said gateway device to said dedicated packet signaling network to direct routing of a call through said switched telecommunications network responsive to said dialing of said telephone number assigned to said first customer station.

* * * * *